(12) United States Patent
Griffiths et al.

(10) Patent No.: US 8,366,404 B2
(45) Date of Patent: Feb. 5, 2013

(54) FUEL SYSTEM

(75) Inventors: Michael Griffiths, Bromsgrove (GB); Martin Richard Kirkman, Birmingham (GB)

(73) Assignee: Goodrich Control Systems (GB)

( * ) Notice: Subject to any disclaimer, the term of this patent is extended or adjusted under 35 U.S.C. 154(b) by 301 days.

(21) Appl. No.: 12/639,439

(22) Filed: Dec. 16, 2009

(65) Prior Publication Data
US 2010/0158707 A1 Jun. 24, 2010

(30) Foreign Application Priority Data

Dec. 18, 2008 (GB) .................................. 0823068.2

(51) Int. Cl.
*F04B 49/00* (2006.01)
(52) U.S. Cl. ........... 417/213; 417/302; 417/310; 60/734
(58) Field of Classification Search ................. 417/212, 417/213, 417.302, 310; 60/734, 39.281; 137/625.62
See application file for complete search history.

(56) References Cited

U.S. PATENT DOCUMENTS

| | | | | |
|---|---|---|---|---|
| 3,023,782 A | * | 3/1962 | Chaves, Jr. et al. | 137/85 |
| 7,337,761 B2 | * | 3/2008 | Bickley | 123/198 DB |

FOREIGN PATENT DOCUMENTS

| | | | |
|---|---|---|---|
| EP | 0388046 | | 9/1990 |
| EP | 0481620 | | 4/1992 |
| EP | 0915241 | | 5/1999 |
| EP | 915241 A2 | * | 5/1999 |
| EP | 1715161 | | 10/2006 |
| EP | 1715161 A2 | * | 10/2006 |
| EP | 1944486 | | 7/2008 |

OTHER PUBLICATIONS

European Search Report dated May 16, 2011.

* cited by examiner

*Primary Examiner* — Devon Kramer
*Assistant Examiner* — Ryan Gatzemeyer
(74) *Attorney, Agent, or Firm* — Andrus, Sceales, Starke & Sawall, LLP

(57) ABSTRACT

A fuel system is described that comprises a pressure raising and shut-off valve (PRSOV), and a control valve arrangement operable to control a fuel pressure applied to a part of the PRSOV urging the PRSOV towards a closed position, wherein the control valve arrangement is supplied with fuel at a pressure controlled by a variable fluid pressure potentiometer network including a variable flow restrictor which is variable in response to changes in the position occupied by the PRSOV.

12 Claims, 3 Drawing Sheets

FUEL SYSTEM

Figure 1:
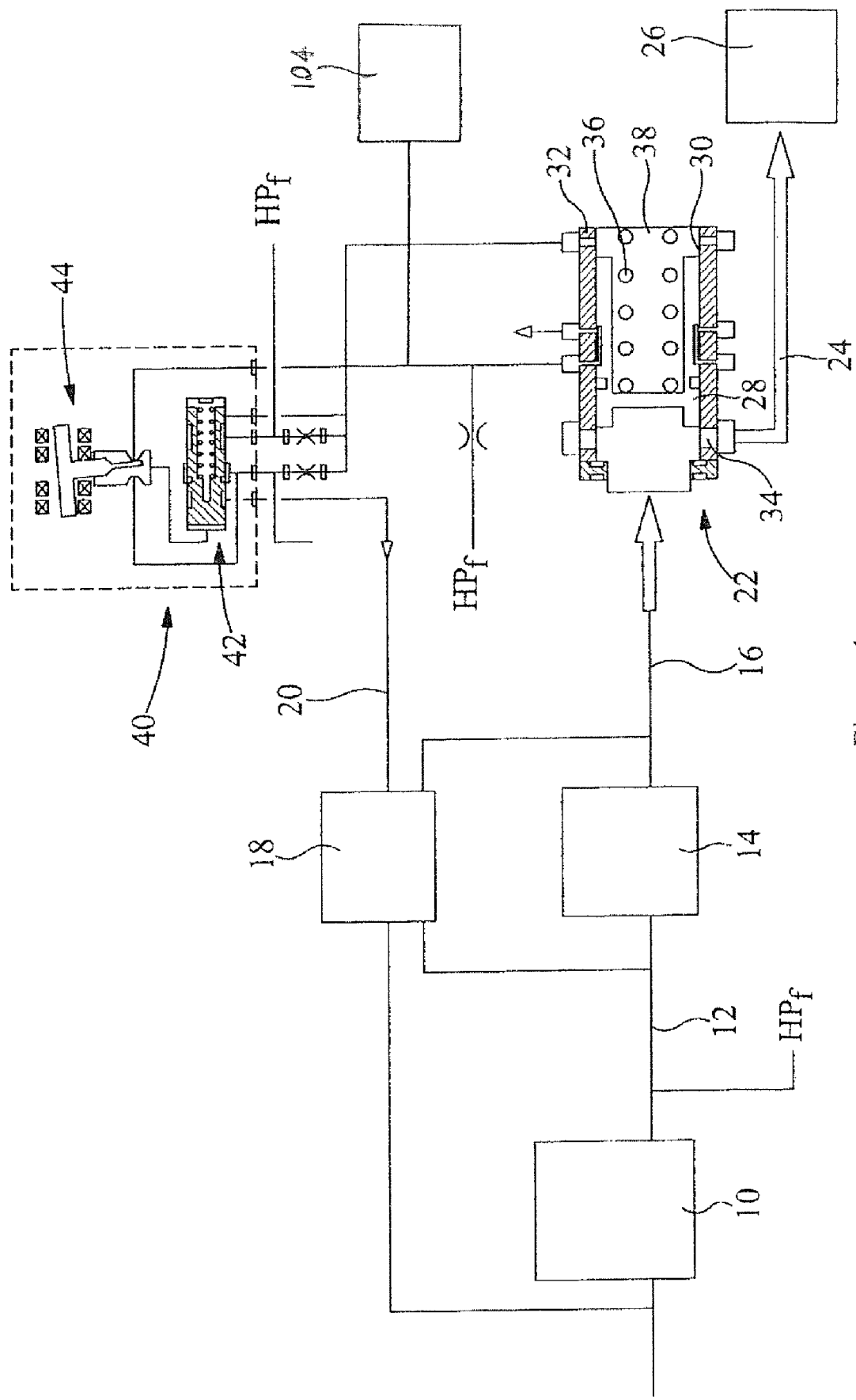

This invention relates to a fuel system, and in particular to a fuel system incorporating an engine shut-down capability permitting rapid engine shut-down.

A typical aircraft turbine engine fuel system, for example as described in U.S. Pat. No. 7,337,761, includes a fuel pump operable to supply fuel at high pressure through a metering valve (MV) and a pressure raising and shut-off valve (PRSOV) to a burner manifold. An electro-hydraulic servo-valve (EHSV) operates under the control of an electronic engine controller (EEC) to supply fuel at high pressure to the PRSOV to urge the PRSOV to a closed position when engine shut-down is required, thereby terminating the supply of fuel to the burner manifold.

In order to ensure a rapid shut-down procedure, it is known to provide a two-stage EHSV, for example as described in U.S. Pat. No. 3,023,782, to control the application of high pressure fuel to the PRSOV to urge it towards its closed position when engine shut-down is required. In such a system the EHSV controls the position occupied by its second stage such that, when engine shut-down is required, not only is fuel at high pressure rapidly applied to the PRSOV to urge it towards its closed position but also a control line connected to a pressure drop control valve (PDCV) is connected to relatively low pressure to increase the degree of opening of the PDCV and thereby rapidly reduce the fuel system pressure, for example by spilling fuel to low pressure and/or by reducing the output rate of the fuel pump where the fuel pump is of the variable displacement type.

In such an arrangement, the EHSV comprises a latching first stage, which controls the position of its second stage. The first stage is moveable between a first position in which it closes an HP inlet, permitting communication between a LP inlet and an outlet, and a second position in which it closes the LP inlet, instead permitting communication between the HP inlet and the outlet. A first stage valve member is moved between these two positions by an electro-magnetic actuator in the form of a torque motor. When in one of these two positions, the magnetisation of the torque motor is intended to hold the valve member against movement without requiring energisation of the torque motor windings.

The fuel pressure applied to the HP inlet of the first stage depends upon the engine operating conditions, and under some operating conditions, such as take-off, the fuel pressure at the HP inlet will be very high and there is a risk that the fuel pressure maybe sufficient to lift the valve member away from the HP inlet against the action of the magnetic forces holding the valve member in position, a process commonly known as de-latching. As such, this de-latching movement could result in movement of the second stage of the EHSV and hence in the application of high pressure fuel to the PRSOV to urge it towards a closed condition, causing uncommanded engine shut-down, which is undesirable. With the move towards more efficient engines and associated stage combustion fuel systems, there is a tendency towards higher fuel system pressures, increasing the risk of such unauthorised de-latching of the EHSV. To avoid such unauthorised de-latching the permanent magnets of the torque motor could be increased in size, thereby increasing the magnetic forces holding the first stage valve member in position. However, this would have undesirable weight penalty consequences. Another possibility is to incorporate a pressure regulator into the system to avoid the application of excessive pressure at the HP inlet. However, it is undesirable to add another component to the system and such regulators are known to be sensitive to contaminated fuel.

It is an object of the invention to provide a fuel system suitable for use in such applications in which the above described disadvantages are overcome or are of reduced effect.

According to the present invention there is provided a fuel system comprising a pressure raising and shut-off valve (PRSOV), and a control valve arrangement operable to control a fuel pressure applied to a part of the PRSOV urging the PRSOV towards a closed position, wherein the control valve arrangement is supplied with fuel at a pressure controlled by a variable fluid pressure potentiometer network including a variable flow restrictor which is variable in response to changes in the position occupied by the PRSOV The variable flow restrictor preferably comprises a port with which a chamber formed in the PRSOV is registerable.

Such an arrangement is advantageous in that it permits control over the fuel pressure applied to the control valve arrangement, avoiding the application of pressures thereto sufficient to lift a valve member thereof other than when required.

The variable flow restrictor is preferably closable to permit the application of fuel under high pressure to the control valve, when desired.

The control valve arrangement preferably takes the form of a two-stage electro-hydraulic servo-valve (EHSV).

The fuel system may include a pressure drop control valve (PDCV), and the control valve arrangement may be operable to control a fuel pressure applied to the PDCV. The PDCV may allow fuel to flow to a low pressure line in the event of the pressure drop across a metering valve (MV) exceeding a predetermined level. Alternatively or additionally it may serve to control the operation of a variable output pump such as a variable displacement vane pump. In such an arrangement, the system pressure can be reduced upon shut-down.

Figure 2:
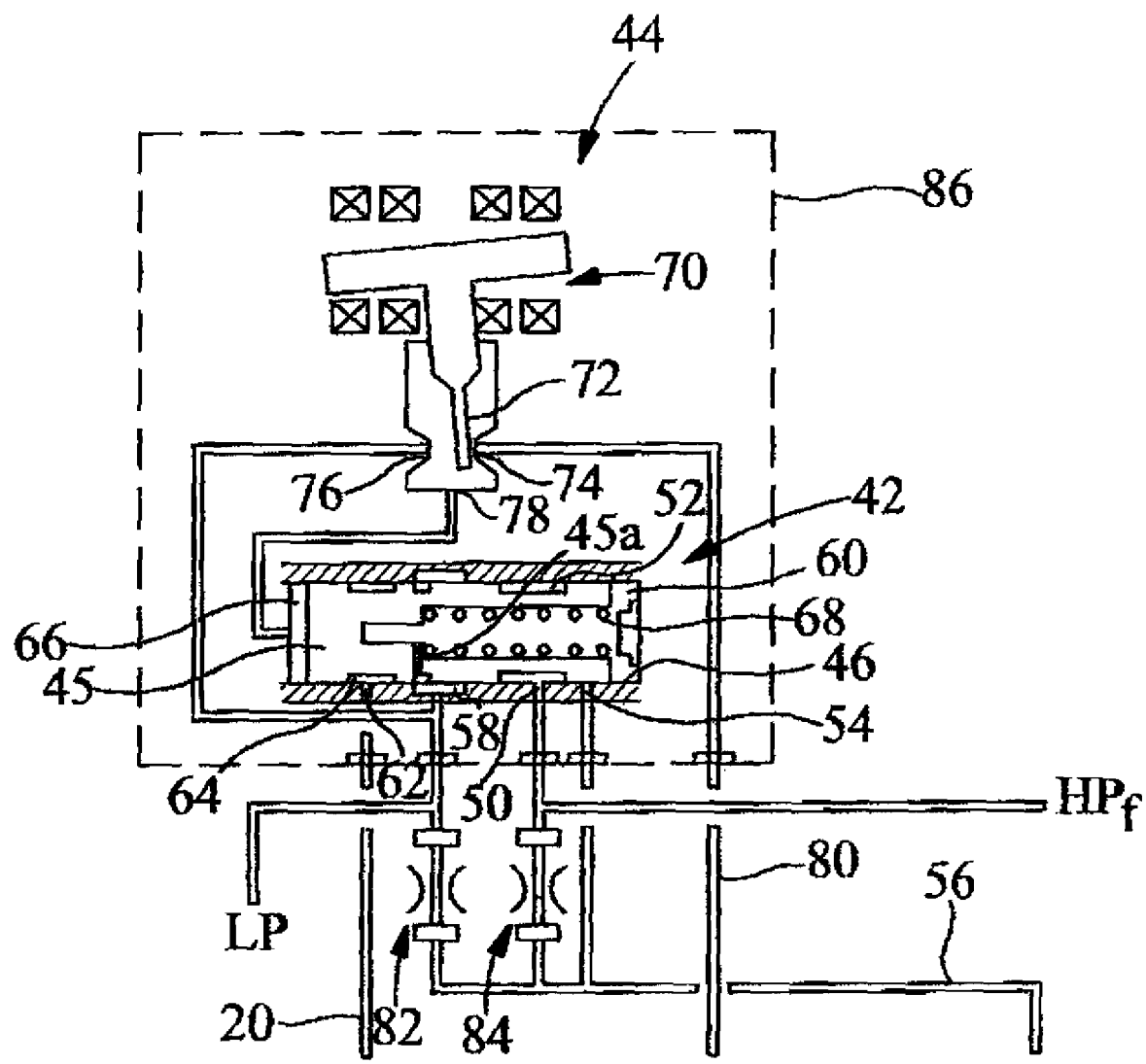
Figure 3:
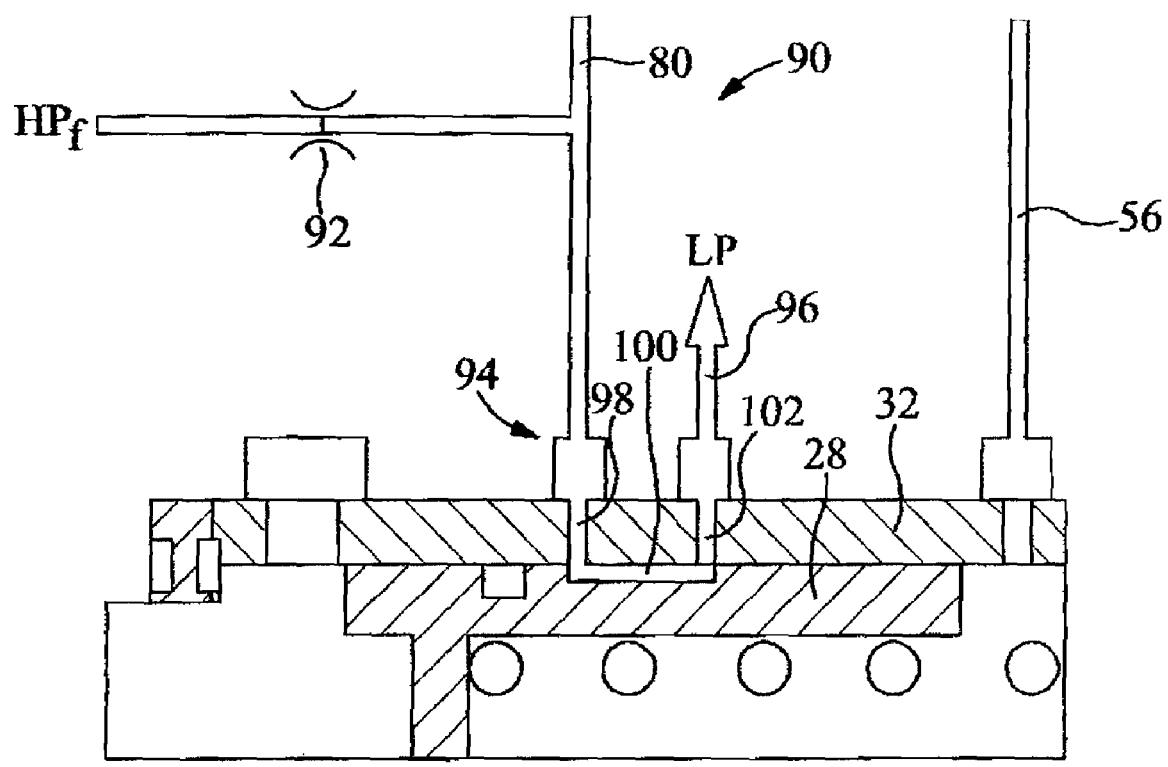

The invention will further be described, by way of example, with reference to the accompanying drawings, in which:

FIG. 1 is a diagrammatic view of a fuel system in accordance with an embodiment of the invention; and FIGS. 2 and 3 are enlargements of parts of FIG. 1.

The fuel system illustrated in the accompanying drawings comprises a fuel pump 10 in the form of a fixed displacement gear pump operable to deliver fuel under high pressure to a supply line 12. A metering valve (MV) 14 controls the delivery of fuel from the supply line 12 to a delivery line 16. A pressure drop control valve (PDCV) 18 is operable to monitor the pressure drop across the MV 14 between the supply and delivery lines 12, 16, the PDCV 18 opening in the event that the pressure drop exceeds a predetermined level. Opening of the PDCV 18 results in fuel from the supply line 12 being returned back to the inlet side of the pump 10. A control line 20 is connected to the PDCV 18, the fuel pressure within the control line 20 further controlling the operation of the PDCV 18 such that in the event that the fuel pressure within the control line 20 falls below a predetermined level, the PDCV 18 will open to permit a reduction in the fuel pressure within the supply and delivery lines 12, 16. It will thus be appreciated that, in this embodiment, the PDCV 18 takes the form of a pressure drop control and spill valve. However, this need not always be the case and the invention is also applicable to arrangements in which such spill functionality is not present, for example to arrangements in which the PDCV is operable to control the delivery rate of a variable output pump, via a pump variable stroke mechanism actuator.

A pressure raising and shut-off valve (PRSOV) 22 is connected to the delivery line 16 and is operable to control the delivery of fuel to an output line 24 connected to a burner manifold 26. The PRSOV 22 comprises a valve member 28 slidable within a bore 30 formed in a housing 32 between a closed position in which the valve member 28 closes an outlet port 34, thereby preventing the delivery of fuel from the delivery line 16 to the output line 24, and a fully open position in which the output port 34 is not obscured by the valve member 28. It will be appreciated that the valve member 28 can also occupy a range of intermediate positions between these extremes. A spring 36 is provided to bias the valve member 28 towards its closed position. In addition, the fuel pressure within a chamber 38 in which the spring 36 is located applies a force to the valve member 28 urging the valve member 28 towards its closed position against the action of the fuel pressure applied to the valve member 28 from the delivery line 16.

The fuel pressure within the chamber 38 is controlled by a control valve arrangement 40. The control valve arrangement 40, which can take the form of an EHSV, comprises an electro-magnetically first stage 44 operable to control the position of a second stage 42. As best shown in FIG. 2, the second stage 42 comprises a spool 45 slidable within a bore 46 formed in a housing. The housing defines a high pressure inlet port 50 connected to high pressure and opening into the bore 46. The spool 45 includes an elongate annular chamber 52 which registers throughout the range of movement of the spool 45 with the high pressure inlet port 50. The housing further defines a control port 54 which communicates via a line 56 with the chamber 38 in the PRSOV. In the position illustrated, the spool 45 closes the port 54, but the spool 45 is movable to the right in the orientation illustrated, to a shut-down position in which the chamber 52 registers with the port 54. It will be appreciated that in this position high pressure fuel is supplied to the line 56 from the high pressure inlet port 50 thus pressurising the chamber 38.

The housing of the second stage further includes a low pressure port 58, connected to low pressure, and of elongate form which communicates via a restricted passage 45a formed in the spool 45 with a spring chamber 60. A second control port 62 is provided which communicates with the control line 20. The spool 45 is provided with an elongate annular chamber 64 which registers with the port 62. In the position illustrated, the chamber 64 communicates only with the port 62, but movement of the spool 45 to the shut-down position results in the chamber 64 registering both with the port 62 and with the low pressure port 58 and it will be appreciated that in this position low pressure fuel is applied to the control line 20 and PDCV 18.

The position occupied by the spool 45 is dependent upon the fuel pressure within a control chamber 66 connected via a line to the first stage 44. When the control chamber 66 is at low pressure as illustrated, the spool 45 is urged to the left in the orientation illustrated by virtue of the spring 68 located in the chamber 60. If the control chamber 66 is raised to a higher pressure, the spool 45 is urged to the right, the higher pressure being sufficient to overcome the action of the spring 68 and low pressure fuel within the chamber 60.

The first stage 44 comprises a torque motor 70 operable to control the position occupied by a valve member 72. The valve member 72 is movable between a position in which it closes a first, relatively high pressure inlet 74, permitting communication between a second, low pressure inlet 76 and an outlet 78 communicating with the control chamber 66 thus holding the control chamber 66 at low pressure, and a second position in which the valve member 72 closes the second inlet 76, permitting communication between the first inlet 74 and the outlet 78, raising the pressure within the control chamber 66 to a pressure related to that within a line 80 connected to the first inlet 74.

As shown in FIG. 2, when the spool 45 occupies the position illustrated in which the port 54 is closed, the fuel pressure within the line 56 is held at an intermediate pressure controlled by the relative sizes of a pair of orifices 82, 84, forming a fuel pressure potentiometer.

As represented by the dashed lines 86 in FIG. 2, the control valve arrangement 40 may comprise a separate module or unit which, in use, is connected to the remainder of the fuel system by a five port connection arrangement.

Referring to FIG. 3, the fuel pressure within the line 80 is controlled by a fluid pressure potentiometer network 90 comprising a fixed orifice 92 controlling the supply of fuel at high pressure to the line 80 and a variable flow restrictor 94 controlling communication between the line 80 and a low pressure line 96. The variable flow restrictor 94 takes the form of a port 98 provided in the housing 32 of the PRSOV 22 which registers with an annular chamber 100 formed in the valve member 28 thereof. A low pressure port 102 is provided in the housing 32 and communicates with the low pressure line 96. When the valve member 28 of the PRSOV 22 occupies its closed position, the chamber 100 does not register with the low pressure port 102. It will be appreciated that in these circumstances, the connection of the line 80 to the high pressure fuel line via the fixed restriction 92 will result in the line 80 being at a relatively high pressure. When the PRSOV 22 occupies the fully open position illustrated, the annular chamber 100 and port 102 register with one another thereby providing a restricted low pressure connection to the line 80, thus the line 80 will be at an intermediate pressure between high and low pressure governed by the operation of the potentiometer network 90.

In use, when the engine is operating under relatively low load demand conditions, the PRSOV 22 will occupy an intermediate position as the fuel pressure applied thereto will be relatively low. Under these conditions the annular chamber 100 and port 102 will not be in communication, or communication therebetween will be limited, thus the fuel pressure within the line 80 will be relatively high. However, as during these operating conditions the engine is operating at a relatively low speed, the pressure of fuel within the line 80 will not be sufficient to cause movement of the valve member 72 away from the first port 74. If, instead, the engine is operating under high fuel flow conditions, for example as experienced during take-off or climb, the fuel pressure within the supply line 12 will be increased due to the increased speed of operation of the pump 10 and the increased fuel pressure would, in the absence of the invention, result in the line 80 being raised to a higher pressure with the associated risk that the valve member 72 may be urged away from the inlet port 74. However, in accordance with the invention under these conditions the PRSOV 22 will occupy the fully open position illustrated in which the annular chamber 100 is brought in to register with the low pressure port 102 with the result that the fuel pressure potentiometer network 90 operates to reduce the fuel pressure within the line 80 to an intermediate level thereby avoiding the application of such high fuel pressures to the inlet port 74. It will be appreciated that, other than when the PRSOV 22 is in its fully open position, fuel flow through the variable restrictor 94 is minimal thus excessive parasitic leakage losses are avoided. This is an important factor in ensuring that the size of the fuel pump required to provide adequate fuel flow delivery to the burner manifold 26 at all engine operating conditions is minimised.

In either of these modes of operation, ie either low load demand conditions or higher load conditions, when the engine is operating normally and shut-down is not required, the spool 45 will be held in the position shown by the spring 68, the magnetic forces being sufficient to ensure that the valve member 72 is held in the desired position, the chamber 66 being held at low pressure by virtue of the operation of the first stage 44. In this position the control ports 54, 62 are both isolated from the respective high and low pressure connections. Consequently, the PDCV 18 will operate normally and the chamber 38 of the PRSOV 22 will experience a pressure set by the restrictors 82, 84, sufficiently low that the PRSOV 22 is open. If it is determined that the engine should be shut down, then the control valve 44 is switched to lift the valve member 72 away from the first inlet port 74 thereby permitting communication between the line 80 and the control chamber 66. The movement of the valve member 72 further breaks communication between the low pressure line and the outlet 78. The increased pressure within the control chamber 66, regardless as to which of the two modes of operation mentioned hereinbefore is occurring, urges the spool 45 to the right in the orientation illustrated with the result that communication is established between the ports 50, 54 thereby bypassing the fluid pressure potentiometer network formed by the restrictors 82, 84, and rapidly pressurising the chamber 38 to a level sufficient to close the PRSOV 22. In addition, the movement of the spool 45 results in communication being established between the low pressure port 58 and the port 62, applying low pressure to the line 20 resulting in the PDCV 18 opening to spill fuel from the supply line 12 back to the inlet side of the pump 10. It will thus be appreciated that rapid shut-down of the engine can be achieved.

As, in accordance with the invention, the first stage 44 is not subject to the peak system pressures which occur under some operating conditions, the risk of unauthorised de-latching thereof, with the associated risk of uncommanded engine shut-down, is reduced, without negatively impacting upon the ability of the fuel system to rapidly shut-down the engine when this is required.

Another benefit of the invention is that the fuel pressure within the line 80 can be used in other applications in which the application of peak system pressures is problematic, such as where proportional control servo-valves (only one of which is shown, denoted by numeral 104) are used in controlling the operation of for example, a metering valve. It will be appreciated that the invention may be beneficial in a number of other applications.

A number of modifications or alterations may be made to the arrangement described hereinbefore without departing from the scope of the invention. For example, although in the arrangement illustrated the PDCV 18 includes spill functionality, if the pump 10 were to be of the variable output type, for example comprising a variable displacement vane pump, the PDCV 18 could perform the additional function of controlling the displacement of the pump to control the rate at which fuel is delivered thereby. In such an arrangement, the spill function of the PDCV 18 may be omitted, if desired.

The invention claimed is:

1. A fuel system comprising a pressure raising and shut-off valve (PRSOV), and a control valve arrangement operable to control a fuel pressure applied to a part of the PRSOV urging the PRSOV towards a closed position, wherein the control valve arrangement comprises a two stage control valve arrangement including a first stage and a second stage, the first stage being operable to control the position occupied by the second stage, and wherein the first stage is supplied with fuel at a pressure controlled by a variable fluid pressure potentiometer network including a variable flow restrictor which is variable in response to changes in the position occupied by the PRSOV.

2. A system according to claim 1, wherein the variable flow restrictor comprises a port with which a chamber formed in the PRSOV is registerable.

3. A system according to claim 1, wherein the variable flow restrictor is closable to permit the application of fuel under high pressure to the control valve arrangement, when desired.

4. A system according to claim 1, wherein the control valve arrangement comprises a two-stage electro-hydraulic servo-valve (EHSV).

5. A system according to claim 1, further comprising a pressure drop control valve (PDCV), the control valve arrangement being operable to control a fuel pressure applied to the PDCV.

6. A system according to claim 5 wherein the PDCV allows fuel to flow to a low pressure line in the event of the pressure drop across a metering valve (MV) exceeding a predetermined level.

7. A system according to claim 5, wherein the PDCV serves to control the operation of a variable output pump.

8. A system according to claim 7, wherein the variable output pump comprises a variable displacement vane pump.

9. A system according to claim 1, wherein fuel at the fuel pressure controlled by the variable fluid pressure potentiometer network is additionally supplied to at least one further device.

10. A system according to claim 9, wherein the said at least one further device comprises a control valve.

11. A system according to claim 10, wherein the control valve is a proportional control servo-valve.

12. A system according to claim 11, wherein the proportional control servo-valve is used in controlling the operation of a fuel metering valve.

* * * * *